(12) United States Patent
Lin

(10) Patent No.: US 9,606,614 B2
(45) Date of Patent: Mar. 28, 2017

(54) LOAD DEVICE AND ELECTRONIC DEVICE ASSEMBLY WITH LOAD DEVICE

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 174 days.

(21) Appl. No.: 14/528,355

(22) Filed: Oct. 30, 2014

(65) Prior Publication Data

US 2015/0241953 A1   Aug. 27, 2015

(30) Foreign Application Priority Data

Feb. 25, 2014   (CN) .......................... 2014 1 0062302

(51) Int. Cl.
*G06F 1/32*   (2006.01)
*G06F 1/26*   (2006.01)
*G06F 1/28*   (2006.01)
*H02H 3/24*   (2006.01)

(52) U.S. Cl.
CPC ............ *G06F 1/3287* (2013.01); *G06F 1/266* (2013.01); *G06F 1/28* (2013.01); *H02H 3/24* (2013.01)

(58) Field of Classification Search
CPC .......... G06F 1/266; G06F 1/28; G06F 1/3287; H02H 3/24; H02H 3/243
See application file for complete search history.

(56) References Cited

U.S. PATENT DOCUMENTS

| 7,349,190 B1* | 3/2008 | Maheedhar | G06F 1/28 327/77 |
|---|---|---|---|
| 2006/0158806 A1* | 7/2006 | Robertson | G06F 1/266 361/62 |
| 2011/0051476 A1* | 3/2011 | Manor | H02M 1/14 363/65 |
| 2012/0303981 A1 | 11/2012 | Heath | |

FOREIGN PATENT DOCUMENTS

| TW | 200530793 A | 9/2005 |
|---|---|---|
| WO | 2006/126160 A2 | 11/2006 |
| WO | 2012/148774 A2 | 11/2012 |

* cited by examiner

*Primary Examiner* — Dennis M Butler
(74) *Attorney, Agent, or Firm* — Zhigang Ma

(57) ABSTRACT

A load device is coupled to an electronic device. The load device include a load, an input interface, an output interface, a detecting module, and a switch module. The detecting module can determine if a parameter of an input power from the input interface is greater than a predefined parameter. The switch module is connected to the input interface, the load and the output interface. The switch module being configured to switch off the input power to the load and the output interface when the parameter of the input power from the electronic device is not greater than the predefined parameter.

9 Claims, 4 Drawing Sheets

LOAD DEVICE AND ELECTRONIC DEVICE ASSEMBLY WITH LOAD DEVICE

CROSS-REFERENCE TO RELATED APPLICATIONS

This application claims priority to Chinese Patent Application No. 201410062302.1 filed on Feb. 25, 2014, the contents of which are incorporated by reference herein.

FIELD

The subject matter herein generally relates to a load device and an electronic device assembly with the load device.

BACKGROUND

Electronic devices, such as computers or monitors, can couple to a plurality of removable load devices, and can supply power to the load devices.

BRIEF DESCRIPTION OF THE DRAWINGS

Implementations of the present technology will now be described, by way of example only, with reference to the attached figures.

DETAILED DESCRIPTION

Figure 1:
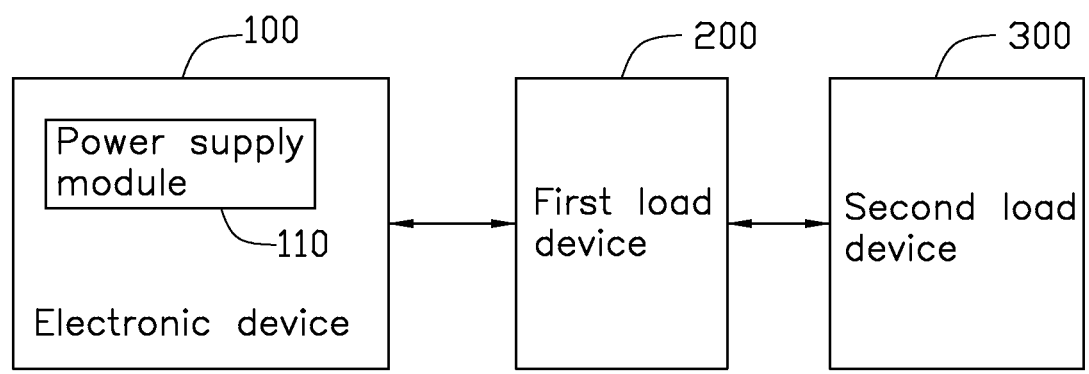
FIG. 1 is a block diagram of one embodiment of an electronic device assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an electronic device assembly in accordance with a first embodiment. The electronic device assembly can include an electronic device 100, a first load device 200, and a second load device 300. The electronic device 100 can be a smart phone, a desktop computer, a laptop computer, a tablet computer, and so on. The electronic device 100 can include a power supply module 110 for supplying power to the electronic device 100, the first load device 200, and the second load device 300. The first load device 200 and the second load device 300 can have the same configuration. The first load device 200 and the second load device 300 can be devices similar to the electronic device 100 or accessories of the electronic device 100, such as hard disks, or set top boxes. The first load device 200 can be coupled to the electronic device 100. The second load device 300 can be coupled to the first load device 200. The electronic device 100, the first load device 200, the second load device 300 can work cooperatively.

Figure 2:
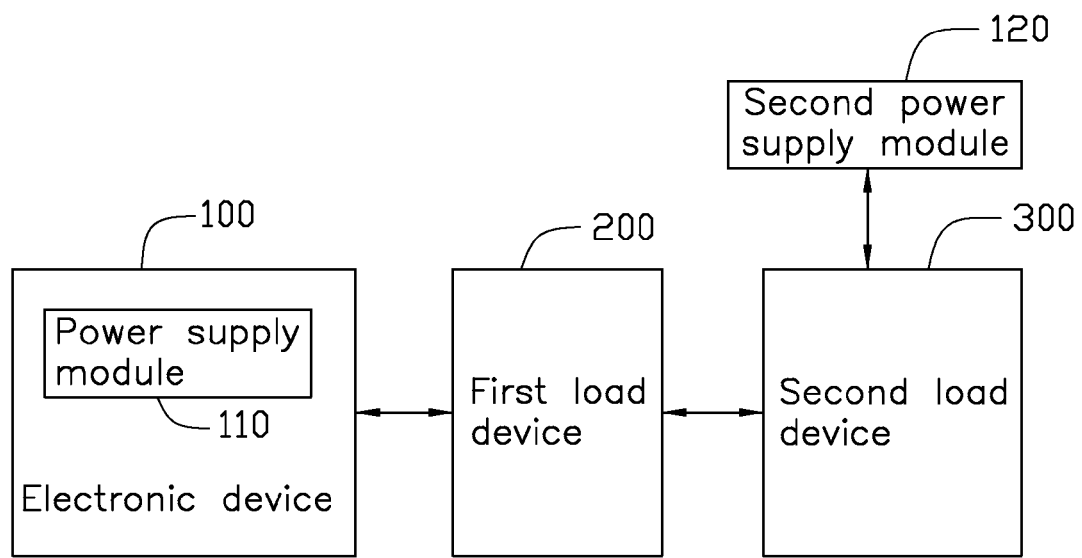
FIG. 2 is a block diagram of another embodiment of an electronic device assembly.

FIG. 2 illustrates an electronic device assembly in accordance with another embodiment. The electronic device assembly can include an electronic device 100, a first load device 200, and a second load device 300. The electronic device 100 can include a first power supply module 110 for supplying power to the electronic device 100, the first load device 200, and the second load device 300. The first load device 200 can be coupled to the electronic device 100. The second load device 300 can be coupled to the first load device 200. When the first power supply module 110 can not supply enough power to the second load device 300, the second load device 300 can be coupled to a second power supply module 120. The electronic device 100, the first load device 200, and the second load device 300 can work cooperatively.

Figure 3:
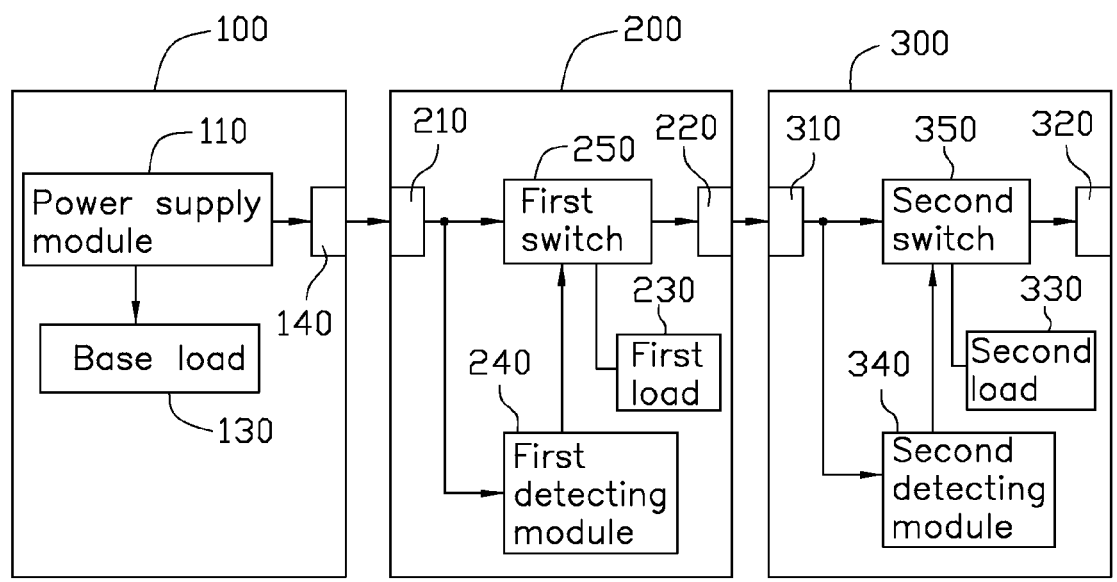
FIG. 3 is block diagram of an other embodiment of the electronic device assembly of FIG. 1.

FIG. 3 illustrates a detail block diagram of the electronic device assembly of FIG. 1. The electronic device 100 can further include a base load 130 and a base output interface 140. The base load 130 is coupled to the first power supply module 110. The base output interface 140 is coupled to the first power supply module 110.

The first load 200 can include a first input interface 210, a first output interface 220, a first load 230, a first detecting module 240, and a first switch 250. The first input interface 210 is coupled to the first switch 250 and the first detecting module 240. The first load 230 is coupled to the first switch 250. The first switch 250 is coupled to the first output interface 220. The first detecting module 240 is coupled to the first switch 250. The first input interface 210 can be matched with the base output interface 140. The first input interface 210 and the first output interface 220 can be matched.

The first input interface 210 of the first load device 200 is coupled to the base output interface 140 of the electronic device 100. The first detecting module 240 can detect a first parameter of an input power from the powers supply module 110, and can detect if the first parameter of the input power is greater than a predefined parameter. The first switch 250 can be switched on when the first parameter of the input power is greater than the predefined parameter. The first load 230 can be powered and the first output interface 220 is electrically connected to the first input interface 210. The first switch 250 can be switched off when the first parameter of the input power is not greater than the predefined parameter. The first load 230 and the first output interface 220 are disconnected from the first input interface 210. The first parameter of the input power can include a voltage value of the input power, a current value of the input power, or a power value of the input power.

The second load 300 can include a second input interface 310, a second output interface 320, a second load 330, a second detecting module 340, and a second switch 350. The second input interface 310 is coupled to the second switch 350 and the second detecting module 340. The second load 330 is coupled to the second switch 350. The second switch 350 is coupled to the second output interface 320. The second detecting module 340 is coupled to the second switch 350. The second input interface 310 can be matched with the first output interface 320. The second input interface 310 and the second output interface 320 can be matched.

The second input interface 310 of the second load device 300 is coupled to the first output interface 220 of the first load device 200. The second detecting module 340 can detect a second parameter of an input power from first load device 200, and can detect if the second parameter of the input power is greater than the predefined parameter. The second switch 350 can be switched on when the second parameter of the input power is greater than the predefined parameter. The second load 330 can be powered and the second output interface 320 is electrically connected to the second input interface 310. The second switch 350 can be switched off when the second parameter of the input power is not greater than the predefined parameter. The second load 330 and the second output interface 320 are disconnected to the second input interface 310. The second parameter of the input power can include a voltage value of the input power, a current value of the input power, or a power value of the input power.

Figure 4:
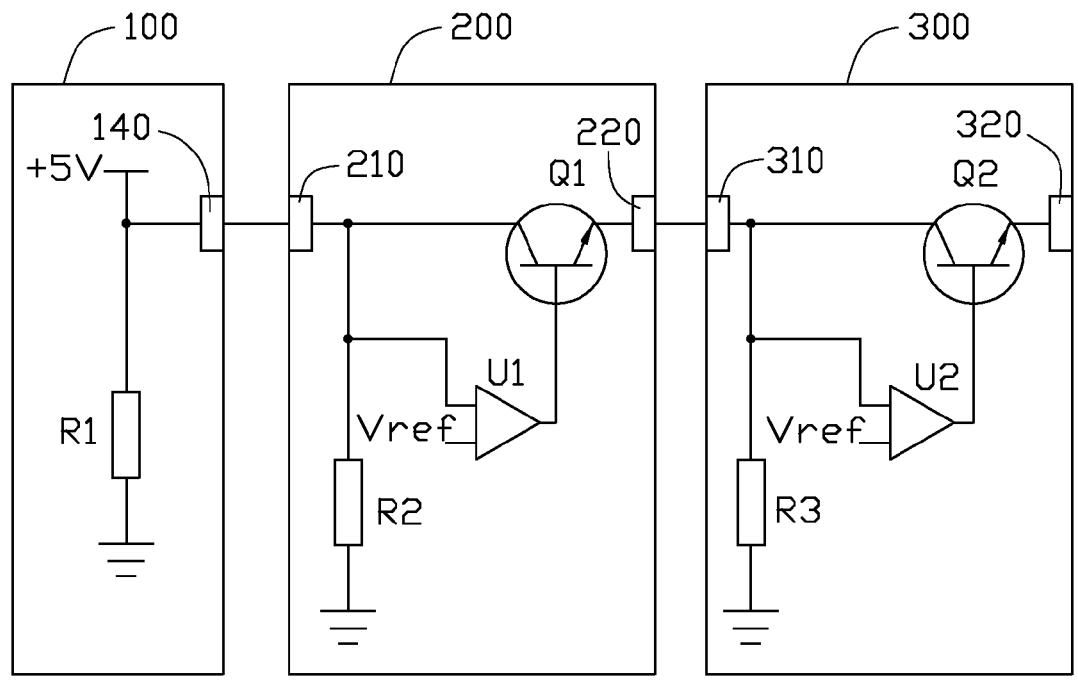
FIG. 4 is a circuit diagram of the electronic device assembly of FIG. 3.

FIG. 4 illustrates a circuit diagram of the electronic device assembly of FIG. 3. The electronic device 100 can include a base resistor R1. The base resistor R1 can be coupled to the power supply module, such as 5V direct current (DC) power source, and can be grounded.

The first load device 200 can include a first resistor R2, a first comparator U1, and a first triode Q1. The first resistor R2 can be coupled to the first input interface and can be grounded. The first detecting module can be the first comparator U1. The first comparator U1 can include an first input terminal, a first Vref terminal, and an first output terminal. The first input terminal is coupled to the first input interface 210. The first output terminal is coupled to the first triode Q1. The first switch can be the first triode Q1. A base of first triode Q1 can be coupled to the first output terminal of the first comparator U1. A collector of the first triode Q1 can be coupled to the first input interface 210. An emitter of the first triode Q1 can be coupled to the first output interface 220. The first triode Q1 can be an NPN-type triode.

The first input interface 210 of the first load device 200 is coupled to the base output interface 140 of the electronic device 100. The first comparator U1 can detect a first voltage of the input power from the power supply module, and can detect if the first voltage of the input power is greater than a Vref voltage. The first triode Q1 can be switched on when the first voltage of the input power is greater than the Vref voltage. The first load can be powered and the first output interface 220 is electrically connected to the first input interface 210. The first switch 250 can be switched off when the first voltage of the input power is not greater than the Vref voltage. The first load and the first output interface 220 are disconnected to the first input interface 210.

The second load device 300 can include a second resistor R3, a second comparator U2, and a second triode Q2. The second resistor R3 can be coupled to the second input interface and can be grounded. The second detecting module can be the second comparator U2. The second comparator U2 can include an second input terminal, a second Vref terminal, and an second output terminal. The second input terminal is coupled to the second input interface 310. The second output terminal is coupled to the second triode Q2. The second switch can be the second triode Q2. A base of second triode Q2 can be coupled to the second output terminal of the second comparator U2. A collector of the second triode Q2 can be coupled to the second input interface 310. An emitter of the second triode Q2 can be coupled to the second output interface 320. The second triode Q2 can be an NPN-type triode.

The second input interface 310 of the second load device 300 is coupled to the first output interface 320. The second comparator U2 can detect a second voltage of the input power from the power supply module, and can detect if the second voltage of the input power is greater than the Vref voltage. The second triode Q2 can be switched on when the second voltage of the input power is greater than the Vref voltage. The second load can be powered and the second output interface 320 is electrically connected to the second input interface 310. The second switch 350 can be switched off when the second voltage of the input power is not greater than the Vref voltage. The second load and the second output interface 320 are disconnected to the second input interface 310.

The embodiments shown and described above are only examples. Many details are often found in the art such as the other features of a electronic device assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. An electronic device assembly comprising:
   an electronic device; and
   at least two load devices coupled to the electronic device in series, the at least two load devices configured to receive power from the electronic device, each of the load devices comprising:
   a load;
   an input interface coupled to the electronic device;
   an output interface;
   a detector configured to determine if a parameter of an input power from the input interface is greater than a predefined parameter; and
   a switch connected to the input interface and the load; the switch configured to switch off the input power to the load when the parameter of the input power from the electronic device is not greater than the predefined parameter, and further configured to switch off the input power to the output interface when the parameter of the input power from the electronic device is not greater than the predefined parameter;
   wherein the switch is located between the input interface and the output interface.

2. The electronic device assembly of claim 1, wherein a type of the input interface is matched with a type of the output interface, and a load device output interface is connected to a next load device input interface.

3. The electronic device assembly of claim 1, wherein the detector comprises a comparator, an input terminal of the comparator is coupled to the input interface, and an output terminal of the comparator is coupled to the switch module.

4. The electronic device assembly of claim 3, wherein the switch comprises a triode, a base of triode is coupled to the output terminal of the comparator, a collector of the triode is coupled to the input interface, and the emitter of the triode is coupled to the output interface.

5. The electronic device assembly of claim 4, wherein the triode is an NPN-type triode.

6. The electronic device assembly of claim 1, wherein the parameter of the input power comprises a voltage value of the input power.

7. The electronic device assembly of claim 1, wherein the parameter of the input power comprises a current value of the input power.

8. The electronic device assembly of claim 1, wherein the parameter of the input power comprises a power value of the input power.

9. The electronic device assembly of claim 1, each of the load devices further comprising a resistor coupled to the input interface, wherein the resistor is grounded.

* * * * *